US012488714B2

(12) United States Patent
Zhang

(10) Patent No.: US 12,488,714 B2
(45) Date of Patent: Dec. 2, 2025

(54) HEAD-MOUNTED DISPLAY DEVICE AND METHOD FOR ADJUSTING DISPLAY BRIGHTNESS THEREOF

(71) Applicant: GOERTEK INC., Shandong (CN)

(72) Inventor: Meng Zhang, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/683,065

(22) PCT Filed: Aug. 24, 2022

(86) PCT No.: PCT/CN2022/114387
§ 371 (c)(1),
(2) Date: Feb. 12, 2024

(87) PCT Pub. No.: WO2023/030109
PCT Pub. Date: Mar. 9, 2023

(65) Prior Publication Data
US 2024/0346964 A1    Oct. 17, 2024

(30) Foreign Application Priority Data
Aug. 30, 2021    (CN) .......................... 202111007299.X

(51) Int. Cl.
*G09G 3/00*    (2006.01)
*G02B 27/00*   (2006.01)
*G02B 27/01*   (2006.01)

(52) U.S. Cl.
CPC ......... *G09G 3/001* (2013.01); *G02B 27/0093* (2013.01); *G02B 27/0172* (2013.01);
(Continued)

(58) Field of Classification Search
CPC .... G02B 2027/0178; G02B 2027/0129; G02B 2027/0127; G02B 2027/0118; G06F 3/013
See application file for complete search history.

(56) References Cited

U.S. PATENT DOCUMENTS

2007/0206289 A1* 9/2007 Inoguchi ............ G02B 27/0172
                                                      359/630
2011/0057863 A1* 3/2011 Sugihara ............ G02B 27/0172
                                                      345/8
(Continued)

FOREIGN PATENT DOCUMENTS

CN    102023383 A    4/2011
CN    103091843 A    5/2013
(Continued)

OTHER PUBLICATIONS

International Search Report from International Application No. PCT/CN2022/114387 mailed Nov. 8, 2022.

*Primary Examiner* — Shaheda A Abdin
(74) *Attorney, Agent, or Firm* — Shih IP Law Group, PLLC

(57) ABSTRACT

Disclosed in some embodiments of the present disclosure is a method for adjusting the display brightness of a head-mounted display device. The method comprises: acquiring eye information of a wearer; acquiring data of the pupil diameter of a first eyeball according to the eye information; dividing a display area of a head-mounted display device into a first display area corresponding to the first eyeball and a second display area corresponding to a second eyeball according to the eye information; and calculating a corresponding first display brightness according to the data of the pupil diameter of the first eyeball, and adjusting the display brightness of the second display area to the first display brightness. By means of the method for adjusting the display brightness of a head-mounted display device, a change in the brightness for the eyes of a wearer can be accurately acquired, thereby guaranteeing the accuracy of brightness adjustment.

8 Claims, 3 Drawing Sheets

(52) U.S. Cl.
CPC ........... *G02B 2027/0138* (2013.01); *G09G 2320/0686* (2013.01); *G09G 2354/00* (2013.01); *G09G 2360/16* (2013.01)

(56) References Cited

U.S. PATENT DOCUMENTS

| | | | |
|---|---|---|---|
| 2013/0057573 A1* | 3/2013 | Chakravarthula | G06F 3/005 345/158 |
| 2014/0104436 A1* | 4/2014 | Bork | H04N 5/58 348/184 |
| 2016/0284129 A1* | 9/2016 | Nishizawa | G06F 3/013 |
| 2018/0314066 A1 | 11/2018 | Bell et al. | |

FOREIGN PATENT DOCUMENTS

| | | | |
|---|---|---|---|
| CN | 104766590 A | | 7/2015 |
| CN | 105262900 A | | 1/2016 |
| CN | 109633907 A | | 4/2019 |
| CN | 109725423 A | | 5/2019 |
| CN | 110275613 A | | 9/2019 |
| CN | 111630847 A | | 9/2020 |
| CN | 111880309 A | | 11/2020 |
| CN | 113781940 A | | 12/2021 |
| JP | 2010085786 A | | 4/2010 |
| JP | 2017161759 A | * | 9/2017 |

\* cited by examiner

HEAD-MOUNTED DISPLAY DEVICE AND METHOD FOR ADJUSTING DISPLAY BRIGHTNESS THEREOF

The present disclosure claims the priority to the Chinese Patent Application No. 202111007299.X, entitled "HEAD-MOUNTED DISPLAY DEVICE AND METHOD FOR ADJUSTING DISPLAY BRIGHTNESS THEREOF" filed with China Patent Office on Aug. 30, 2021, the entire contents of which are incorporated into the present disclosure by reference.

TECHNICAL FIELD

The present disclosure relates to a technical field of head-mounted display technology, and more particularly, to a head-mounted display device and a method for adjusting display brightness thereof.

DESCRIPTION OF RELATED ART

This section provides merely y background information related to the present disclosure and is not necessarily prior art.

With the increasing development of information technology and high-tech industries, head-mounted display devices such as AR glasses, VR glasses and many other devices are gradually entering people's lives. Among them, devices based on Augmented Reality (AR) technology can present virtual information in the real world. When users use AR devices, they can not only see the external real scene, but also see the virtual scenes presented by the AR devices at the same time. Therefore, the light brightness of the user's eyes includes the light brightness of the external environment and the display brightness of the AR device.

Since the display effect presented to the user by superimposing a virtual scene on top of the external real scene is closely related to the matching of the above two display brightness, the effect of displaying the virtual image in the user's field of view is not good when the external light is too bright or too dark, it is necessary to adjust the display brightness of the AR device to prevent that the virtual image cannot be clearly seen when the external light is too strong, or to prevent the virtual image from being dazzling when the external light is too dark. The methods of collecting ambient brightness through ambient light sensors in existing AR devices can only collect the brightness of the environment where the user is located, and cannot accurately identify the brightness entering into the user's eyes. Therefore, the function of automatic adjustment of display brightness of the existing head-mounted display devices is imperfect, and there is a problem of poor adjustment effect.

SUMMARY

In order to solve the problem that the existing head-mounted display devices have a poor automatic adjustment effect of the display brightness, a first aspect of the present disclosure provides a method for adjusting display brightness of a head-mounted display device, the method including:

acquiring eye information of a wearer;
acquiring data of a pupil diameter of a first eyeball according to the eye information;
dividing a display area of the head-mounted display device into a first display area corresponding to the first eyeball and a second display area corresponding to a second eyeball, according to the eye information; and
acquiring a relationship between the pupil diameter and the display brightness, calculating a corresponding first display brightness according to the data of the pupil diameter of the first eyeball, and adjusting a display brightness of the second display area to the first display brightness.

The method for adjusting display brightness of a head-mounted display device according to the embodiment of the present disclosure acquires the data of the pupil of the first eyeball in real time, and calculates a corresponding first display brightness by using the data of the pupil diameter of the first eyeball according to the relationship between the pupil diameter and the display brightness, as a result, a change in the brightness for the eyes of a wearer can be accurately acquired, thereby guaranteeing the accuracy of subsequent brightness adjustment. The method for adjusting display brightness of a head-mounted display device according to the embodiment of the present disclosure adjusts the display brightness of the second display area corresponding to the second eyeball to the first display brightness until the pupil diameter of the first eyeball no longer changes, and adjusts the display brightness of the first display area corresponding to the first eyeball to the same brightness as the display brightness of the second display area. In the embodiment, by acquiring the data of the pupil diameter of the user's eyeball on one side, and adjusting the display area corresponding to the eyeball on the other side to the calculated first display brightness, thereby automatic adjustment of the display brightness is realized, and the problem that the existing head-mounted display devices have poor automatic adjustment effect of the display brightness is solved. In addition, by means of detecting the eyeball on one side and adjusting the display brightness on the other side, the problem that the display brightness reaches limit value due to positive feedback is prevented.

Further, the method for adjusting display brightness of a head-mounted display device according to the embodiment of the present disclosure may have the following technical features:

In some embodiments of the present disclosure, after the adjusting a display brightness of the second display area to the first display brightness, the method further includes: in accordance with the pupil diameter of the first eyeball stops changing, adjusting the display brightness of the first display area to be the same as the display brightness of the second display area.

In some embodiments of the present disclosure, after adjusting the display brightness of the first display area to be the same as the display brightness of the second display area, the method further includes:

acquiring data of a pupil diameter of the second eyeball, calculating a corresponding second display brightness according to the data of the pupil diameter of the second eyeball, and adjusting the display brightness of the first display area to the second display brightness; and
adjusting the display brightness of the second display area to be the same as the display brightness of the first display area, in accordance with the pupil diameter of the second eyeball stops changing.

In some embodiments of the present disclosure, the dividing the display area of the head-mounted display device into a first display area and a second display area according to the eye information includes:

determining a center point between a pupil of the first eyeball and a pupil of the second eyeball, and determining a line passing through the center point and perpendicular to a line connecting the pupil of the first eyeball and the pupil of the second eyeball as a center line; and dividing the display area into a first display area located on one side of the center line and a second display area located on another side of the center line according to the center line.

In some embodiments of the present disclosure, the acquiring a relationship between the pupil diameter and the display brightness includes:

adjusting the head-mounted display device to a variety of different display brightnesses, and collecting a plurality of different pupil diameters of a wearer under environments of a variety of different display brightnesses; and calculating the relationship between the pupil diameter and the display brightness according to the plurality of different pupil diameters and a variety of the different display brightnesses.

In some embodiments of the present disclosure, the calculating the relationship between the pupil diameter and the display brightness according to the plurality of different pupil diameters and the a variety of the different display brightnesses includes:

drawing a first relationship curve between the pupil diameter and the display brightness by taking the pupil diameter as an abscissa and the display brightness as an ordinate.

In some embodiments of the present disclosure, the data of the pupil diameter of the first eyeball includes a final value when the pupil diameter of the first eyeball stops changing, and the calculating a corresponding first display brightness according to the data of the pupil diameter of the first eyeball includes: looking up a display brightness corresponding to the final value according to the first relationship curve, as the first display brightness.

In some embodiments of the present disclosure, the calculating the relationship between the pupil diameter and the display brightness according to the plurality of different pupil diameters and a variety of the different display brightnesses includes:

drawing a second relationship curve between a change value of the pupil diameter and a change value of the display brightness by taking the change value of the pupil diameter as an abscissa and the change value of the display brightness as an ordinate.

In some embodiments of the present disclosure, the data of the pupil diameter of the first eyeball includes a change value of the pupil diameter of the first eyeball, and the calculating a corresponding first display brightness according to the data of the pupil diameter of the first eyeball includes: looking up the change value of the display brightness corresponding to the change value of the pupil diameter of the first eyeball according to the second relationship curve.

A second aspect of the present disclosure provides a head-mounted display device, including:

an eyeball tracking camera configured to capture an eyeball image in real time and acquire eye information according to the eyeball image; and a controller including a control device and a computer-readable storage medium, wherein the computer-readable storage medium stores control instructions therein, and the control device implements the method for adjusting display brightness of a head-mounted display device of any one of the above embodiments by executing the control instruction, the control device including:

a calculation module configured to acquire data of the pupil diameter of the first eyeball and calculate the first display brightness; and a control module configured to adjust display brightness of the first display area and the second display area.

The head-mounted display device according to the embodiments of the present disclosure has the same advantages as the method for adjusting display brightness of a head-mounted display device in the above embodiments. The head-mounted display device proposed in the present disclosure can accurately acquire a change in the brightness for the eyes of a wearer, and can accurately adjust the display brightness.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely a part of the drawings of the present disclosure, and for those of ordinary skill in the art, other drawings can also be obtained from the provided drawings without any creative effort.

DETAILED DESCRIPTIONS

Technical solutions of embodiments of the present disclosure will be described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

Figure 1:
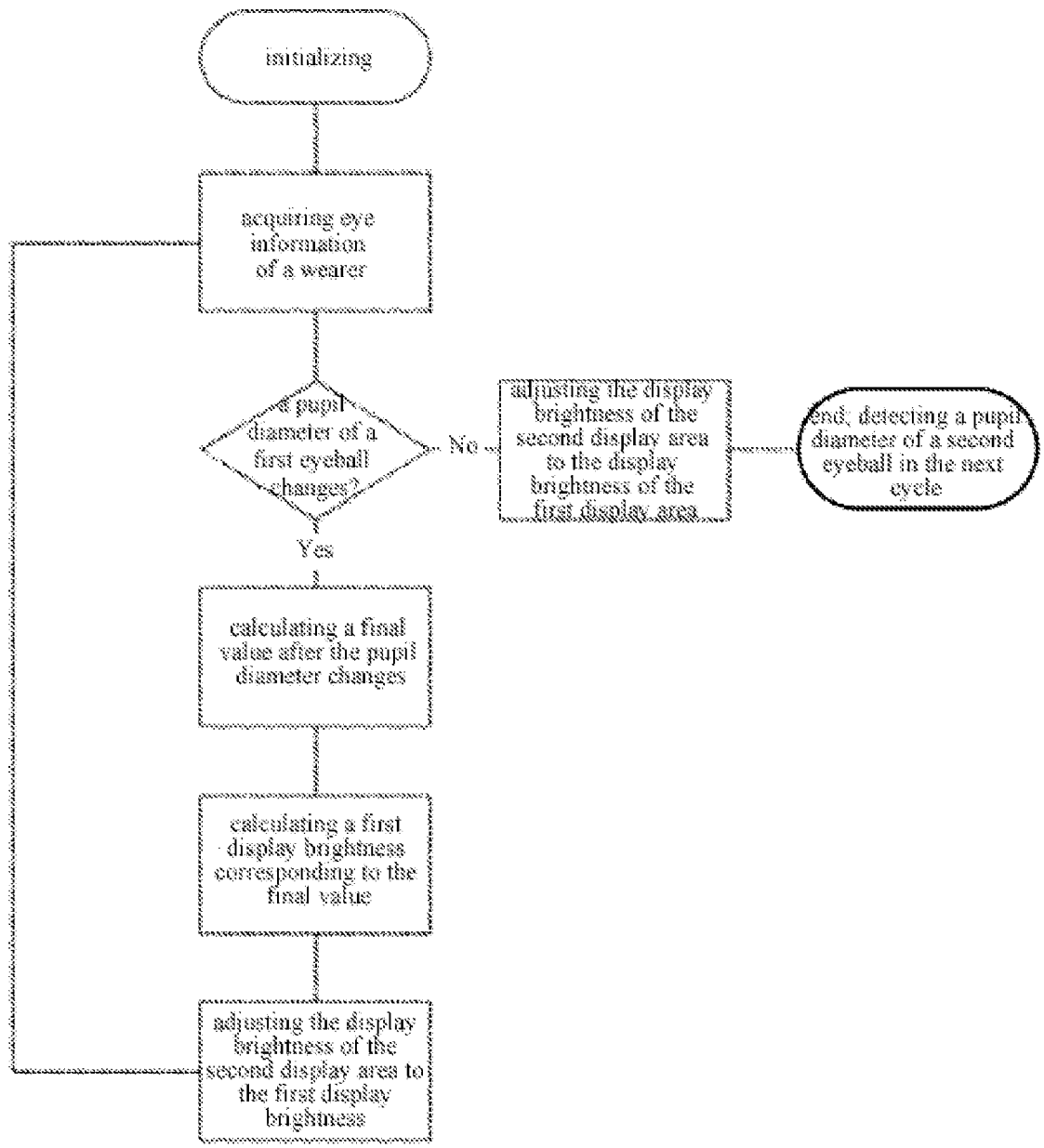
FIG. 1 is a schematic flowchart 1 of a method for adjusting display brightness of a head-mounted display device according to an embodiment of the present disclosure.
Figure 2:
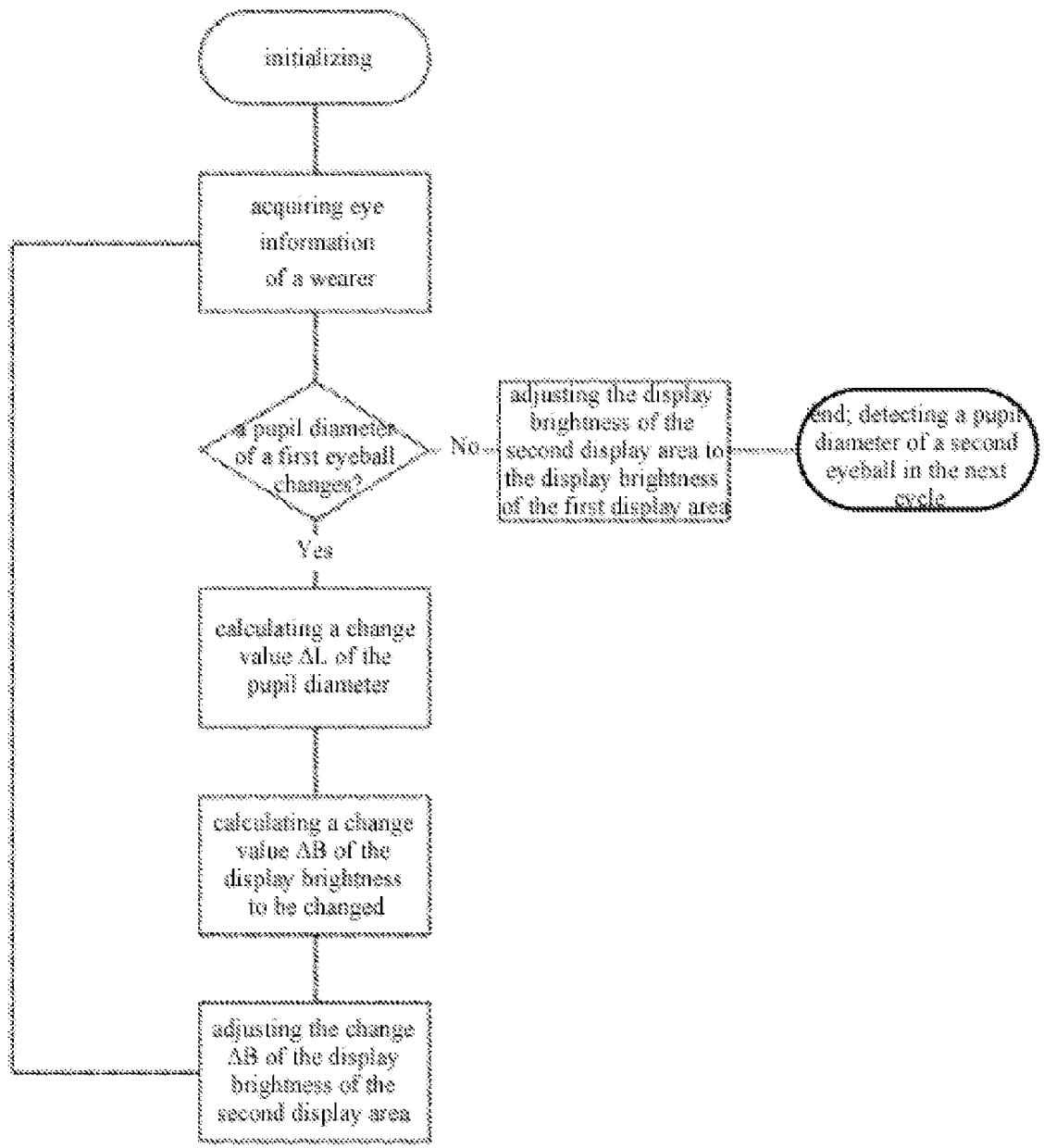
FIG. 2 is a schematic flowchart 2 of the method for adjusting display brightness of a head-mounted display device according to an embodiment of the present disclosure.
Figure 3:
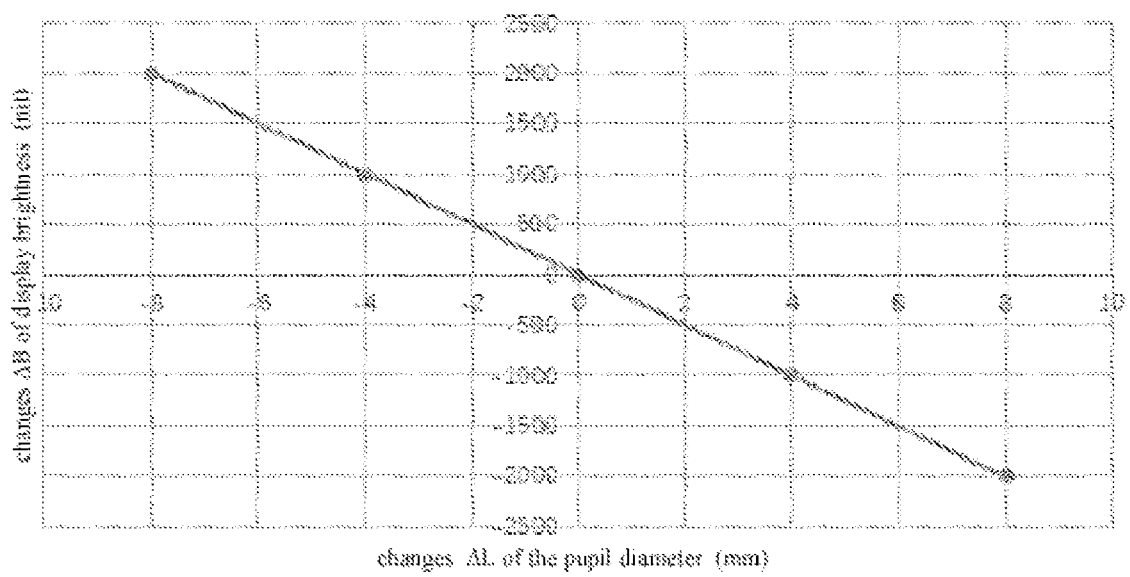
FIG. 3 is a schematic diagram of a second relationship curve between the change value of the pupil diameter and the change value of the display brightness in the method for adjusting display brightness of a head-mounted display device according to an embodiment of the present disclosure.

As illustrated in FIGS. 1-3, an embodiment in a first aspect of the present disclosure provides a method for adjusting display brightness of a head-mounted display device, the method including:

Step 1: acquiring eye information of a wearer;

Step 2: acquiring data of the pupil diameter of a first eyeball according to the eye information;

Step 3: dividing a display area of a head-mounted display device into a first display area corresponding to the first eyeball and a second display area corresponding to a second eyeball according to the eye information; and Step 4: acquiring a relationship between the pupil diameter and the display brightness, calculating a corresponding first display brightness according to the data of the pupil diameter of the first eyeball, and adjusting the display brightness of the second display area to the first display brightness.

In an optional implementation, the method further includes step 5: adjusting the display brightness of the first display area to be the same as the display brightness of the second display area in accordance with the pupil diameter of the first eyeball stops changing.

The method for adjusting display brightness of a head-mounted display device according to the embodiment of the present disclosure acquires the data of the pupil of the first eyeball in real time, and calculates a corresponding first display brightness by using the data of the pupil diameter of the first eyeball according to the relationship between the pupil diameter and the display brightness, a change in the brightness for the eyes of a wearer can be accurately acquired, thereby guaranteeing the accuracy of subsequent brightness adjustment, and the method for adjusting display brightness of a head-mounted display device according to the embodiment of the present disclosure adjusts the display brightness of the second display area corresponding to the second eyeball to the first display brightness until the pupil diameter of the first eyeball no longer changes, and adjusts the display brightness of the first display area corresponding to the first eyeball to the same brightness as the display brightness of the second display area. In the embodiment, by acquiring data of the pupil diameter of the user's eyeball on one side, and adjusting the display area corresponding to the eyeball on the other side to the calculated first display brightness, thereby automatic adjustment of the display brightness is realized, and the problem that the display brightness of the existing head-mounted display devices has a poor automatic adjustment effect is solved.

In addition, it should be noted that in related technology, in the process of adjusting display brightness by using data of the pupil diameter, the display brightness generally needs to be increased when the pupil diameter is detected to be reduced due to high ambient brightness, as a result, a change in display brightness is positively correlated with a change in external brightness, to form a positive feedback phenomenon, which eventually causes the display brightness to reach a limit, affecting the accuracy of the display brightness adjustment. In the embodiment, by means of detecting the eyeball on one side and adjusting the display area corresponding to the eyeball on the other side, and finally synchronizing the display brightness of the display areas on both sides, in this way, the positive feedback phenomenon caused by both detecting and adjusting the display brightness for the eyeball on the same side can be prevented, and the accuracy of brightness adjustment is improved.

Acquiring eye information of a wearer in the step 1 includes collecting an eyeball photo. Specifically, in some embodiments of the present disclosure, an eyeball image can be captured in real time by an eyeball tracking camera, so that the eye information can be acquired according to the eyeball image. The number of the eyeball tracking camera may be one or two, and the eyeball tracking camera can capture images of the first eyeball and the second eyeball.

In the step 2 of acquiring data of the pupil diameter of a first eyeball according to the eye information, it will be understood that when the wearer wears the head-mounted display device, the diameter of the pupil may change due to a change in the intensity of external light. In this step, it may be configured to detect an initial value of the pupil diameter of the first eyeball, and a final value of the pupil diameter when the pupil size no longer changes, and calculate a change value of the pupil diameter according to the initial value and the final value. Accordingly, in the embodiment, the data of the pupil diameter of the first eyeball may include one or more of the above-mentioned initial value, final value and change value. If the diameter of the pupil of the first eyeball does not change, then the display brightness of the first display area at this time is recorded as standard brightness, and the display brightness of the second display area can be adjusted to be the same as the display brightness of the first display area.

In the step 3 of dividing a display area of a head-mounted display device into a first display area and a second display area according to the eye information, the eye information is the detected size data of the first eyeball and the second eyeball. In some embodiments of the present disclosure, it may be configured to detect the size of the pupil of the first eyeball, the size of the pupil of the second eyeball, and a distance between the center of the first pupil and the center of the second pupil, so as to determine a center point between the pupil of the first eyeball and the pupil of the second eyeball, and it may be configured to divide the display area into the first display area and the second display area located on both sides of the center line by taking a line passing through the center point and perpendicular to a line connecting the pupil of the first eyeball and the pupil of the second eyeball as a center line. The first display area corresponds to the first eyeball, and the second display area corresponds to the second eyeball, that is to say, the first eyeball is located in the display brightness environment generated by the first display area, and the second eyeball is located in the display brightness environment generated by the second display area.

In the step 4, there are many ways to acquire the relationship between the pupil diameter and the display brightness. For example, in some embodiments of the present disclosure, it may be configured to adjust the head-mounted display device to a variety of different display brightnesses, and collect a plurality of different pupil diameters of the wearer under environments of a variety of different display brightnesses, record data of a variety of different display brightnesses and the plurality of pupil diameters as described above, and calculate corresponding relationship expression or relationship table.

In some embodiments of the present disclosure, as illustrated in FIG. 1, it may be configured to draw a relationship curve according to the plurality of different pupil diameters and a variety of different display brightnesses. Specifically, collecting multiple sets of data, then drawing a first relationship curve between the pupil diameter and the display brightness according to the multiple sets of data by taking the pupil diameter as an abscissa and the display brightness as an ordinate. Thereby, the display brightness that needs to be adjusted can be obtained according to the first relationship curve and the acquired pupil diameter.

On the basis of the above embodiments, the data of the pupil diameter of the first eyeball includes a final value when the pupil diameter of the first eyeball stops changing. Therefore, the display brightness corresponding to the final value can be looked up as the first display brightness according to the first relationship curve, and the display brightness of the second display area can be adjusted to the first display brightness.

In other embodiments of the present disclosure, as illustrated in FIG. 2, it may be configured to draw a relationship curve according to a change value $\Delta L$ of the plurality of different pupil diameters and a change value $\Delta B$ of a variety of different display brightnesses. Specifically, collecting multiple sets of data, then drawing a second relationship curve between the change value ΔL of the pupil diameter and the change value ΔB of the display brightness, as illustrated in FIG. 3, by taking the change value ΔL of the pupil diameter as an abscissa and the change value ΔB of the display brightness as an ordinate. Thereby, a corresponding change value that the display brightness should increase or decrease can be looked up according to the second relationship curve and the acquired change value of the pupil diameter.

On the basis of the above embodiments, the data of the pupil diameter of the first eyeball includes a change value of the pupil diameter of the first eyeball, thus, as illustrated in FIG. 2, the change value of the display brightness corresponding to the change value of the pupil diameter of the first eyeball can be looked up according to the second relationship curve, so as to calculate the first display brightness according to the initial value and change value of the display brightness.

In the step 5, after the pupil diameter of the first eyeball stops changing, the display brightness of the first display area is adjusted to be the same as the display brightness of the second display area. It will be understood that in the embodiment, it is configured to detect the pupil diameter of the first eyeball in real time and calculate a corresponding first display brightness in real time until the pupil diameter of the first eyeball stops changing, and at this time, stopping the adjustment of the display brightness of the second display area, and directly adjusting the display brightness of the first display area to the final display brightness of the second display area, thereby further avoiding the occurrence of positive feedback phenomenon in the first display area.

Further, in some embodiments of the present disclosure, it is configured such that, after adjusting the display brightness of the first display area to be the same as the display brightness of the second display area, continue to detect the second eyeball, and the detection and calculation steps are the same as the above-mentioned steps 1 to 5, thereby will not be repeated here. Specifically, after acquiring the data of the pupil diameter of the second eyeball, if the pupil diameter of the second eyeball continues to change, then calculating a corresponding second display brightness according to the data of the pupil diameter of the second eyeball, and adjusting the display brightness of the first display area to the second display brightness until the pupil diameter of the second eyeball stops changing, subsequently adjusting a final display brightness of the second display area to be the same as the display brightness of the first display area.

An embodiment of a second aspect of the present disclosure provides a head-mounted display device, including:
an eyeball tracking camera configured to capture an eyeball image in real time to acquire eye information according to the eyeball image; and a controller including a control device and a computer-readable storage medium, wherein the computer-readable storage medium stores a control instruction therein, and the control device implements the method for adjusting display brightness of a head-mounted display device according to any one of the above embodiments by executing the control instruction, the control device includes: a calculation module configured to acquire the data of the pupil diameter of the first eyeball and calculate the first display brightness; and a control module configured to adjust display brightness of the first display area and the second display area.

The head-mounted display device proposed in the embodiments of the present disclosure has the same advantages as the method for adjusting display brightness of a head-mounted display device in the above embodiments. The head-mounted display device proposed in the present disclosure can accurately acquire a change in the brightness for the eyes of a wearer, and can accurately adjust the display brightness.

The various embodiments in this specification are described in a parallel or progressive manner, and each embodiment focuses on the differences from other embodiments, and the same or similar parts between the various embodiments may be referred to each other. As for the device disclosed in the embodiments, since it corresponds to the method disclosed in the embodiment, the description is relatively simple. For relevant parts, please refer to the description of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above description in terms of function. Whether these functions are performed by means of hardware or software depends on the specific application and design constraints of the technical solution. Those skilled in the art may implement the described functions for each specific application by using different methods, but such implementations should not be considered beyond the scope of the present disclosure.

The steps of the method or algorithm described in connection with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "include", "comprise" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "including a . . . " does not preclude the presence of additional identical elements in the process, method, article or apparatus including the elements.

What is claimed is:

1. A method for adjusting display brightness of a head-mounted display device, comprising:
acquiring eye information of a wearer;
acquiring data of a pupil diameter of a first eyeball according to the eye information;
dividing a display area of a head-mounted display device into a first display area corresponding to the first eyeball and a second display area corresponding to a second eyeball, according to the eye information; and
acquiring a relationship between the pupil diameter and the display brightness, calculating a corresponding first display brightness according to the data of the pupil diameter of the first eyeball, and adjusting a display brightness of the second display area to the first display brightness, wherein after the adjusting a display brightness of the second display area to the first display brightness, the method further includes:

adjusting display brightness of the first display area to be the same as the display brightness of the second display area, in accordance with the pupil diameter of the first eyeball stops changing, and wherein the acquiring a relationship between the pupil diameter and the display brightness includes:

adjusting the head-mounted display device to a variety of different display brightnesses, and collecting a plurality of different pupil diameters of a wearer under environments of a variety of display brightness; and calculating the relationship between the pupil diameter and the display brightness according to the plurality of different pupil diameters and a variety of the different display brightnesses.

2. The method for adjusting display brightness of a head-mounted display device according to claim 1, wherein after the adjusting the display brightness of the first display area to be the same as the display brightness of the second display area, the method further includes:

acquiring data of a pupil diameter of the second eyeball, calculating a corresponding second display brightness according to the data of the pupil diameter of the second eyeball, and adjusting the display brightness of the first display area to the second display brightness; and adjusting the display brightness of the second display area to be the same as the display brightness of the first display area, in accordance with the pupil diameter of the second eyeball stops changing.

3. The method for adjusting display brightness of a head-mounted display device according to claim 1, wherein the dividing the display area of the head-mounted display device into a first display area and a second display area according to the eye information includes:

determining a center point between a pupil of the first eyeball and a pupil of the second eyeball, and determining a line passing through the center point and perpendicular to a line connecting the pupil of the first eyeball and the pupil of the second eyeball as a center line; and dividing the display area into a first display area located on one side of the center line and a second display area located on another side of the center line according to the center line.

4. The method for adjusting display brightness of a head-mounted display device according to claim 1, wherein the calculating the relationship between the pupil diameter and the display brightness according to the plurality of different pupil diameters and a variety of the different display brightnesses includes:

drawing a first relationship curve between the pupil diameter and the display brightness by taking the pupil diameter as an abscissa and the display brightness as an ordinate.

5. The method for adjusting display brightness of a head-mounted display device according to claim 4, wherein the data of the pupil diameter of the first eyeball includes a final value when the pupil diameter of the first eyeball stops changing, and the calculating a corresponding first display brightness according to the data of the pupil diameter of the first eyeball includes: looking up a display brightness corresponding to the final value according to the first relationship curve, as the first display brightness.

6. The method for adjusting display brightness of a head-mounted display device according to claim 1, wherein the calculating the relationship between the pupil diameter and the display brightness according to the plurality of different pupil diameters and a variety of the different display brightnesses includes:

drawing a second relationship curve between a change value of the pupil diameter and a change value of the display brightness by taking the change value of the pupil diameter as an abscissa and the change value of the display brightness as an ordinate.

7. The method for adjusting display brightness of a head-mounted display device according to claim 6, wherein the data of the pupil diameter of the first eyeball includes a change value of the pupil diameter of the first eyeball, and the calculating a corresponding first display brightness according to the data of the pupil diameter of the first eyeball includes: looking up the change value of the display brightness corresponding to the change value of the pupil diameter of the first eyeball according to the second relationship curve.

8. A head-mounted display device, comprising:

an eyeball tracking camera configured to capture an eyeball image in real time and acquire eye information according to the eyeball image; and a controller comprising a control device and a computer-readable storage medium, wherein the computer-readable storage medium stores a control instruction therein, and the control device implements the method for adjusting display brightness of a head-mounted display device according to claim 1 by executing the control instruction, the control device comprising:

a calculation module configured to acquire the data of the pupil diameter of the first eyeball and calculate the first display brightness; and a control module configured to adjust display brightness of the first display area and the second display area.

* * * * *